United States Patent Office 3,377,038
Patented Apr. 9, 1968

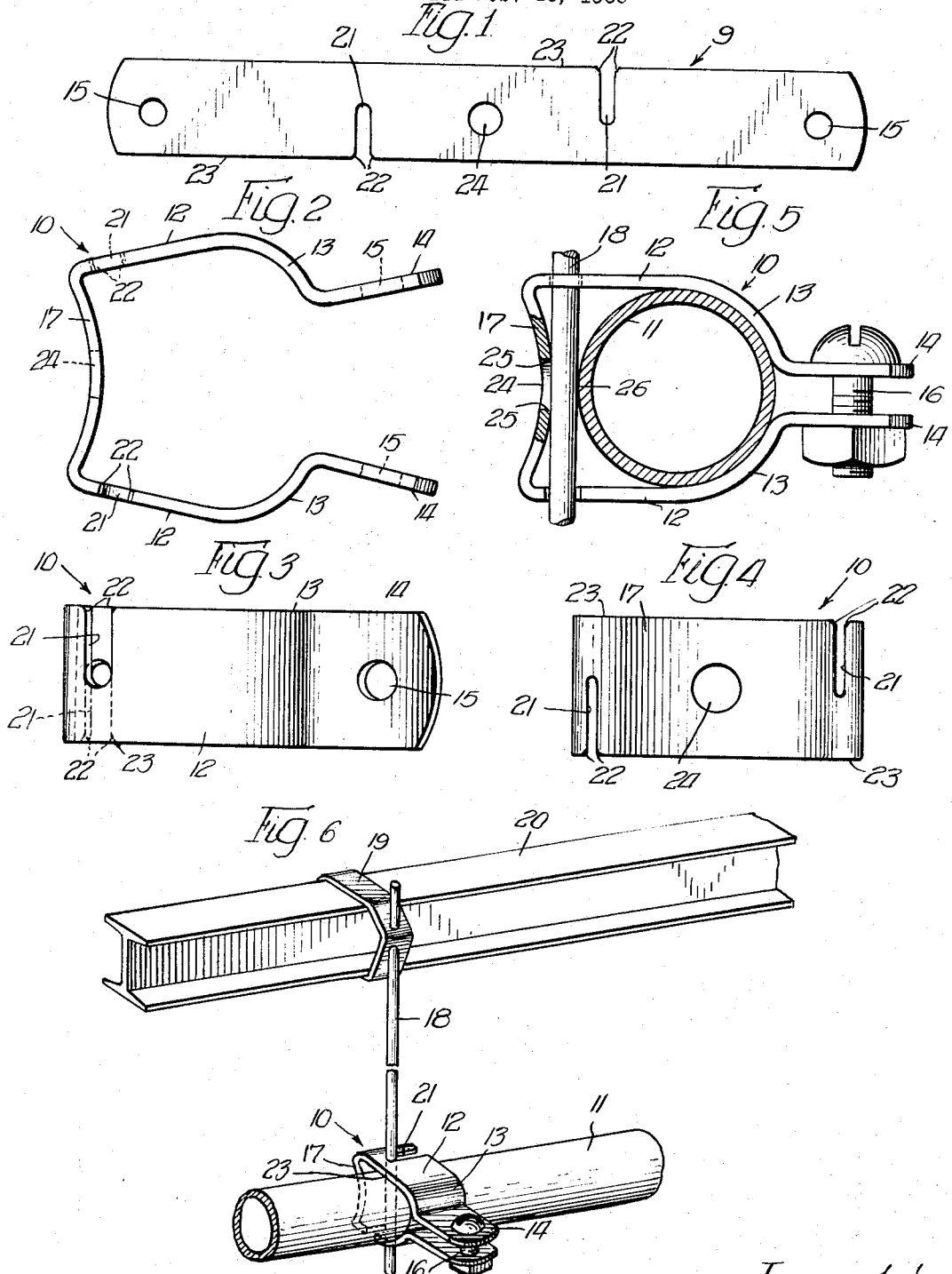

3,377,038
CLAMP FOR SECURING CONDUIT TO A SUPPORT ROD OR DROP WIRE
James Loudon, Arlington Heights, Ill., assignor to Minerallac Electric Company, Chicago, Ill., a corporation of Illinois
Filed Feb. 15, 1966, Ser. No. 527,452
6 Claims. (Cl. 248—59)

ABSTRACT OF THE DISCLOSURE

Clamp for mounting thin wall conduit on support rods or drop wires such as used in ceiling construction. The clamp is a generally U-shaped member which receives the conduit between the sides which are apertured near the base or bottom of the member for receiving a support rod or wire transversely of the conduit. The distal ends of the clamp member are drawn together by a bolt and nut so as to both tighten the clamp onto the conduit and also draw the conduit into clamping engagement with the support rod or wire. Preferably the base or bottom of the U-shaped clamp member is inwardly bowed to engage the support rod or wire and an opening is provided in the mid-portion of the bowed base or bottom so that the edges of the opening engage or bite into the support rod or wire.

---

This invention relates, generally, to clamps and it has particular relation to clamps for securing a conduit, such as thin wall pipe for electrical conductors, flexible metallic tubing, armored cable, copper water tubes and the like, to a support rod or drop wire commonly used in building construction and elsewhere.

Among the objects of this invention are: To provide for clamping a conduit to a support rod or drop wire in a new and improved manner; to hold the clamp securely to the support rod in a preliminary manner for subsequently receiving the conduit; to employ a single adjustable means, such as a bolt, for securing the clamp to the conduit and thereby the conduit to the support rod; to arrange for the clamp to have limited area high pressure contact engagement with the support rod; to employ a generally U-shaped clamp with the sides arranged to engage the conduit and apertured to receive the support rod between the bottom of the clamp and the conduit and transversely of the conduit; to form the clamp from ordinary steel as distinguished from more expensive hardened or spring steel; and to arrange for the bottom of the clamp to have limited area high pressure contact engagement with the support rod by providing an opening therein edge portions of which engage the support rod.

In the drawings:

FIG. 1 is a plan view of a stamping or blank used to form the U-shaped conduit clamp;

FIG. 2 is a view, in end elevation, of the U-shaped clamp after it has been formed from the stamping or blank shown in FIG. 1;

FIG. 3 is a view, in side elevation, of the clamp shown in FIG. 2;

FIG. 4 is a bottom plan view of the U-shaped clamp;

FIG. 5 is a view, partly in end elevation and partly in section, showing the U-shaped clamp applied to a conduit and clamped to a support rod; and, FIG. 6 is a perspective view illustrating the application of the U-shaped clamp to a conduit and to a support rod depending from a beam clamp carried by a beam.

In FIG. 1 the reference character 9 designates, generally, a stamping or blank that is preferably formed of ordinary soft steel which can be readily deformed into the generally U-shaped clamp as shown at 10 in FIG. 2. While hardened or spring steel could be used this is not necessary thereby reducing the cost of my clamps.

The U-shaped clamp 10 is arranged to be secured in supporting relationship to a conduit 11. For different sizes of conduit 11, correspondingly different sizes of the U-shaped clamp 10 and stamping or blank 9 are employed. The conduit 11 is clamped between parallel sides 12—12 of the clamp 10 and engaged by curved portions 13 which terminate in offset distal ends 14. The distal ends 14 are provided with apertures 15 through which a clamp bolt 16 extends.

The bottom or yoke portion 17 of the U-shaped clamp 10 is bowed inwardly for resilient engagement with a support rod or drop wire 18 that is mounted on and depends from a beam clamp 19 that is carried by a horizontally extending beam 20. It will be understood that the particular arrangement for holding the support rod or drop wire 18 is conventional and that other arrangements can be employed.

The support rod or drop wire 18 is positioned between the conduit 11 and the inwardly bowed bottom 17 of the U-shaped clamp 10 as shown in FIG. 5 and also in FIG. 6. The support rod or drop wire 18 extends transversely of the conduit 11 through apertures in the form of slots 21 which preferably have beveled entrance portions 22 and extend from the central portion of the U-shaped clamp 10 to the opposite edges 23 thereof. It will be understood that the positions of the slots 21 can be reversed from those shown in the drawing so that they extend in directions opposite to the directions in which they are shown. In the arrangement shown the clamps 10 can be installed on the drop wires or rods 18 by a clockwise twisting motion. If the slots 21—21 are reversed then a counterclockwise motion is required.

In order to increase the clamping action between the U-shaped clamp 10 and the support rod or drop wire 18 and thereby increase the weight which the clamps 10 will support and also reduce their tendency to slip on the rods 18 before being tightened onto a conduit 11, the bottom 17 is provided with a central aperture 24, the edge portions 25 of which are arranged to have small area high pressure or biting contact engagement with the juxtaposed surface of the support rod or drop wire 18.

In the original formation of the stamping or blank 9, as shown in FIG. 1, the apertures 15, slots 21 and central opening 24 are formed therein. Then the stamping or blank 9 is deformed by suitable means to the shape indicated in FIG. 2 where the sides 12 diverge. In order to apply the clamp 10 to the support rod or drop wire 18, the sides 12 are moved toward each other, to the position shown in FIG. 5, which brings the apertures 21 in the form of slots into registry with each other and permits the clamp 10 to be applied to the support rod or drop wire 18 by rotating it in a clockwise direction as viewed in FIG. 6. Where it is preferred to apply the clamp 10 by a counterclockwise direction, the apertures in the form of slots 21 are arranged to extend in opposite directions. On release of the force holding the sides 12 in parallel relation, the support rod or drop wire 18 is securely clamped between the outer sides of the slots 21 and the edge portions 25 of the central opening 24. Thus a number of the U-shaped clamps 10 may be readily installed and securely held in position on a series of support rods or drop wires 18 and subsequently the conduit 11 can be installed by passage through the clamps and the bolts 16 tightened. This tightening action brings the sides 12 and curved portions 13 into clamping engagement with the conduit 11 and also forces it into engagement with the support rod or drop wire 18 at 26, FIG. 5, so that the assembly is securely clamped together.

What is claimed as new is:

1. Means for mounting a conduit on a support rod comprising a generally U-shaped clamp member for receiving said conduit between the sides which are apertured for receiving said support rod therethrough transversely of and between said conduit and the bottom of said U-shaped clamp member, and contracting means between the distal ends of the sides of the U-shaped clamp member to move them into clamping engagement with said conduit and said conduit into clamping engagement with the support rod.

2. Conduit mounting means as set forth in claim 1 wherein the sides of the U-shaped clamp member in unstressed conditions diverge with the apertures therein at least partially out of registry whereby on moving said sides toward each other to bring said apertures into registry, insertion of the support rod through said apertures, and release of said sides said support rod is clamped thereto.

3. Conduit mounting means as set forth in claim 2 wherein draw-up means extend between the distal ends of the sides of the U-shaped clamp member to move them into clamping engagement with said conduit and said conduit into clamping engagement with the support rod.

4. Conduit mounting means as set forth in claim 2 wherein the bottom of the U-shaped clamp member is inwardly bowed to engage the side of the support rod opposite said conduit.

5. Conduit mounting means as set forth in claim 4 wherein that portion of the inwardly bowed bottom of the U-shaped clamp member in engagement with the support rod is characterized by having limited area high pressure contact engagement therewith.

6. Conduit mounting means as set forth in claim 5 wherein the apertures are in the form of slots extending to one edge of the respective side, the inwardly bowed bottom is apertured to provide edge portions having limited area high pressure engagement with the support rod, the distal ends of the sides of the U-shaped clamp member are offset toward each other, and a bolt extends through said offset ends to clamp the sides of the U-shaped clamp member to said conduit and said conduit to said support rod.

References Cited

UNITED STATES PATENTS

| | | | |
|---|---|---|---|
| 2,915,275 | 12/1959 | Korka | 248—327 |
| 2,968,850 | 1/1961 | Tinnerman | 52—38 X |
| 3,126,182 | 3/1964 | Stamper | 248—72 |
| 3,253,843 | 5/1966 | Statham | 287—51 |

ROY D. FRAZIER, *Primary Examiner.*

J. FRANKLIN FOSS, *Assistant Examiner.*